US012596579B2

(12) United States Patent
Yang et al.

(10) Patent No.: US 12,596,579 B2
(45) Date of Patent: Apr. 7, 2026

(54) METHOD AND SYSTEM FOR ACCELERATING APPLICATION PERFORMANCE IN SOLID STATE DRIVE

(71) Applicant: Samsung Electronics Co., Ltd., Gyeonggi-do (KR)

(72) Inventors: Jing Yang, Glen Allen, VA (US); Shuyi Pei, Santa Clara, CA (US); Jingpei Yang, San Jose, CA (US); Rekha Pitchumani, Oak Hill, VA (US)

(73) Assignee: Samsung Electronics Co., Ltd (KR)

( * ) Notice: Subject to any disclaimer, the term of this patent is extended or adjusted under 35 U.S.C. 154(b) by 741 days.

(21) Appl. No.: 17/882,124

(22) Filed: Aug. 5, 2022

(65) Prior Publication Data

US 2023/0393906 A1 Dec. 7, 2023

Related U.S. Application Data

(60) Provisional application No. 63/349,324, filed on Jun. 6, 2022.

(51) Int. Cl.
| | |
|---|---|
| *G06F 9/50* | (2006.01) |
| *G06F 3/06* | (2006.01) |
| *G06F 9/38* | (2018.01) |
| *G06F 9/48* | (2006.01) |
| *G06F 13/16* | (2006.01) |

(52) U.S. Cl.
CPC ............ *G06F 9/5033* (2013.01); *G06F 3/061* (2013.01); *G06F 3/0679* (2013.01); *G06F 9/3877* (2013.01); *G06F 9/4881* (2013.01); *G06F 9/5027* (2013.01); *G06F 13/1668* (2013.01); *G06F 3/06* (2013.01); *G06F 2212/214* (2013.01)

(58) Field of Classification Search
None
See application file for complete search history.

(56) References Cited

U.S. PATENT DOCUMENTS

| | | | |
|---|---|---|---|
| 7,350,044 | B2 | 3/2008 | Keays |
| 8,108,590 | B2 | 1/2012 | Chow et al. |
| 8,205,037 | B2 | 6/2012 | Swing et al. |
| 8,239,639 | B2 | 8/2012 | Sinclair |
| 8,266,367 | B2 | 9/2012 | Yu et al. |

(Continued)

FOREIGN PATENT DOCUMENTS

| | | |
|---|---|---|
| KR | 1020170128012 | 11/2017 |
| WO | WO 2011/068614 | 6/2011 |

OTHER PUBLICATIONS

Cho, Sangyeun et al., "Active Disk Meets Flash: A Case for Intelligent SSDs", Proceedings of the 27th international ACM Conference on International Conference on.

(Continued)

*Primary Examiner* — Qing Yuan Wu
(74) *Attorney, Agent, or Firm* — The Farrell Law Firm, P.C.

(57) ABSTRACT

A method and a memory device are provided. One or more host central processing units (HCPUs) of the memory device may receive a workload from a host application. The workload includes an identifier (ID). The workload may be distributed to a central processing unit (CPU) of the memory device based on the ID. The workload may be distributed to channels of the memory device based on the CPU.

18 Claims, 7 Drawing Sheets

(56)  References Cited

U.S. PATENT DOCUMENTS

| | | | |
|---|---|---|---|
| 9,009,391 | B2 | 4/2015 | Aswadhati |
| 9,846,650 | B2 | 12/2017 | Chang et al. |
| 9,891,838 | B2 | 2/2018 | Woo et al. |
| 9,940,287 | B2 | 4/2018 | Das Sharma |
| 10,078,448 | B2 | 9/2018 | Lim et al. |
| 10,423,331 | B2 | 9/2019 | Choi et al. |
| 10,466,938 | B2 | 11/2019 | Seo et al. |
| 10,474,374 | B2 | 11/2019 | Choi et al. |
| 10,877,909 | B2 | 12/2020 | Lee |
| 11,086,805 | B2 | 8/2021 | Chiu |
| 11,093,143 | B2 | 8/2021 | Tumkur Shivanand et al. |
| 11,288,182 | B2 | 3/2022 | Hsu |
| 2017/0031633 | A1 | 2/2017 | Lee |
| 2020/0042225 | A1 | 2/2020 | Oh et al. |
| 2021/0026538 | A1* | 1/2021 | Jain ........................ G06F 3/0611 |
| 2021/0026563 | A1* | 1/2021 | Jain ..................... G06F 13/1668 |
| 2022/0147392 | A1 | 5/2022 | Choi et al. |

OTHER PUBLICATIONS

Woo, Yeong-Jae et al., "FMMU: A Hardware-Automated Flash Map Management Unit for Scalable Performance of NAND Flash-Based SSDs".
European Search Report dated Oct. 2, 2023 issued in counterpart application No. 23171233.2-1203, 9 pages.

\* cited by examiner

FIG. 2

502 — Receive workload from host application at HCPU

504 — Distribute workload to embedded CPU based on workload ID

506 — Distribute workload to channels based on embedded CPU

700

METHOD AND SYSTEM FOR ACCELERATING APPLICATION PERFORMANCE IN SOLID STATE DRIVE

PRIORITY

This application is based on and claims priority under 35 U.S.C. § 119(e) to U.S. Provisional Patent Application Ser. No. 63/349,324, filed on Jun. 6, 2022, the entire contents of which are incorporated herein by reference.

TECHNICAL AREA

The present disclosure relates generally to solid state drives (SSDs), and more particularly, to a method and system for accelerating application performance in an SSD.

BACKGROUND

Big data applications handle relatively large datasets. SSDs are widely used as a hardware feature in cloud infrastructure for big data services. SSDs are well suited for big data applications because they provide fast storage performance, and are efficient and cost-effective. Specifically, input/output (I/O) intensive operations can be accelerated by using an SSD architecture. In a multi-tenant cloud environment, data types and workloads are diverse in terms of data units, application workloads, interfaces, and quality of service (QoS) requirements, for example.

SUMMARY

Embodiments enable the management of SSD data using identifiers (IDs) to drive data to a specified embedded central processing unit (CPU). Each embedded CPU has the same or different mapping algorithms/interfaces that are optimized for certain application types to fully utilize underlying hardware resources.

According to an embodiment, a method of a memory device is provided. One or more host CPUs (HCPUs) of the memory device may receive a workload from a host application. The workload may include an ID. The workload may be distributed to a CPU of the memory device based on the ID. The workload may be distributed to channels of the memory device based on the CPU.

According to an embodiment, a memory device is provided that includes one or more HCPUs that may be configured to receive a workload, including an ID, from a host application, and distribute the workload to a CPU of the memory device based on the ID. The memory device also includes the CPU that may be configured to distribute the workload to channels of the memory device based on the CPU.

According to an embodiment, a memory device is provided that includes one or more HCPUs that may be configured to receive workloads from host applications. The workloads may include respective IDs. The one or more HCPUs may also be configured to distribute the workloads to CPUs of the memory device based on the respective IDs. The memory device also includes CPUs that may be configured to distribute the workloads to respective channels of the memory device based on the CPUs. The memory device also includes channels that may be configured to receive the workloads from the CPUs for data storage and retrieval.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 2 is a diagram illustrating an SSD supporting multiple storage interfaces through different firmware, according to an embodiment;

DETAILED DESCRIPTION

Figure 1:
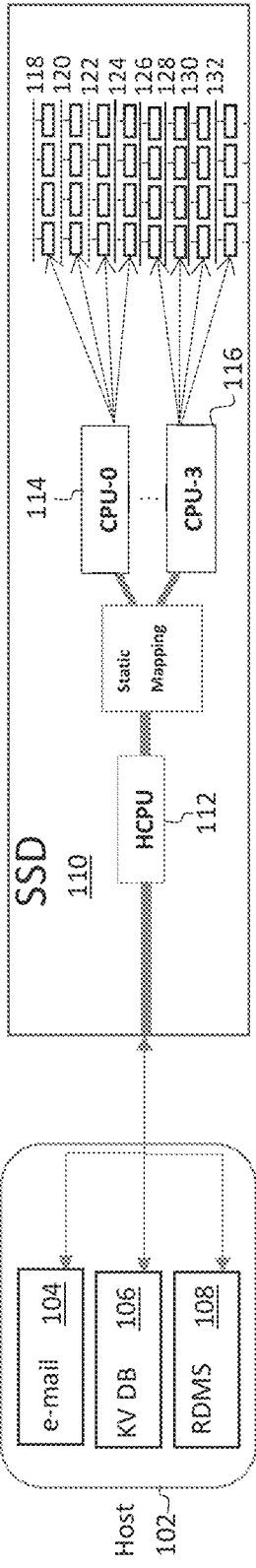
FIG. 1 is a diagram illustrating an SSD supporting multiple storage interfaces, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device, according to one embodiment, may be one of various types of electronic devices utilizing storage devices. The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), NVlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

An SSD may support multiple storage interfaces, and a flash translation layer (FTL) mapping algorithm for the SSD involves the distribution of data blocks to different embedded CPUs of the SSD. Embedded CPUs have had homogeneous configurations, and data distribution may be performed by using, for example, logical block addressing (LBA) modulo of the number of embedded CPUs.

In order to improve data distribution efficiency on a multi-storage interface device, embodiments may provide a method to manage data distribution using IDs that drive data to specified embedded CPUs. Each embedded CPU may be configured or optimized for certain kinds of applications in order to fully utilize the underlying hardware resources.

Specifically, embodiments provide methods for efficiently placing data on an NAND flash, where multiple interfaces are supported. By tagging data from different applications, data may be processed by a corresponding embedded CPU for efficient placement and retrieval.

Thus, the embodiments provide for the tagging of application data to a dedicated embedded CPU, where each embedded CPU may support a different mapping algorithm, and each embedded CPU may support a different host application or interface.

This results in flexible data placement and mapping algorithms, efficient data mapping to meet different performance requirements, and improved garbage collection efficiency.

FIG. 1 is a diagram illustrating an SSD supporting multiple storage interfaces, according to an embodiment. A host 102 is shown to include host applications such as, for example, an email server 104, a key-value (KV) database 106, and a relational database management system (RDMS) 108. The email server 104 may require small random read/write (R/W) workloads. The KV database 106 may require small random read workloads and large sequential R/W workloads. The relational database management system 108 may require workloads with structured data and patterns. The different workloads, and corresponding data, of the email server 104, the KV database 106, and the relational database management system 108 may be mixed and provided to an SSD 110.

The SSD 110 includes a HCPU 112 that receives the mixed workloads (e.g., data blocks), which may be distributed through embedded CPU-0 114 through embedded CPU-3 116, which run identical firmware. The workloads are distributed to the embedded CPUs using an LBA modulo of the number of embedded CPUs, for example. The LBA modulo of the number of embedded CPUs provides a solution similar to round robin that distributes workloads among embedded CPUs.

Figure 2:
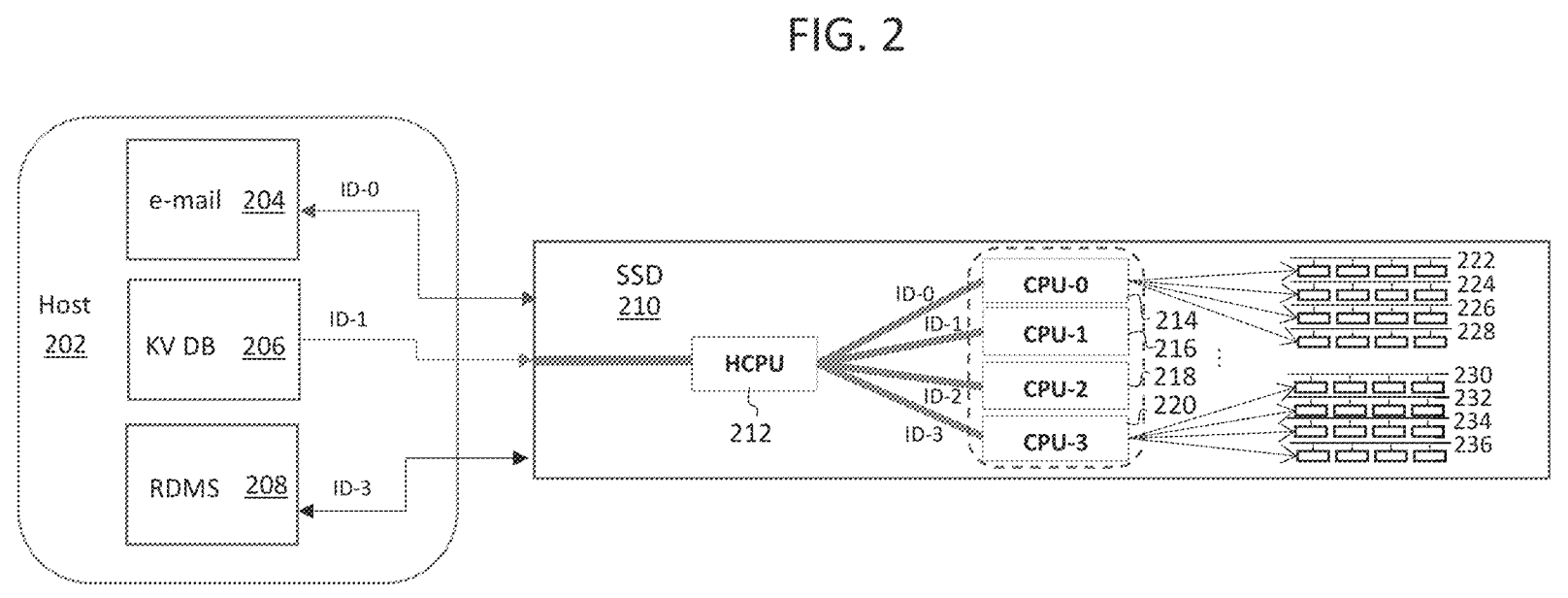

The workloads may be distributed from the embedded CPUs (114-116) to their respective channels (e.g., flash chips). For example, the embedded CPU-0 114 may provide workloads to CH-0 118, CH-1 120, CH-2 122, and CH-3 124, and the embedded CPU-3 116 may provide workloads to CH-12 126, CH-13 128, CH-14 130, and CH-15 132. Accordingly, workloads from different host applications or tenants may be distributed to all channels. However, the SSD 110 should also support multi-interface by placing data from different applications separately and efficiently FIG. 2 is a diagram illustrating an SSD supporting multiple storage interfaces through different firmware, according to an embodiment.

Similar to FIG. 1, a host 202 is shown to include host applications such as, for example, an email server 204, a KV database 206, and a relational database management system 208. The different workloads (e.g., data blocks) of the email server 204, the KV database 206, and the relational database management system 208 may be provided with corresponding IDs and provided to an SSD 210. The IDs may include a namespace ID, a stream ID, or a port (e.g., a zoned namespace or KV interface). In the case of a namespace ID, data may be stored on the drive that is mapped to the namespace. In the case of a stream ID, applications may tag write commands with corresponding steam IDs.

According to an embodiment, multiple embedded CPUs may be utilized to handle data placement based on different requirements. Each embedded CPU may support a specific kind of mapping algorithm (e.g., page-level mapping or KV interface mapping) to fit various application requirements. Thus, a fine-grained and provisioned SSD device resource allocation method may be provided.

The SSD 210 includes an HCPU 212 that may receive the workloads, and may route workloads (e.g., data blocks or commands) to embedded CPUs based on IDs of the workloads. Specifically, the HCPU 212 may decode a data transfer command, and then may send the workload to the corresponding embedded CPU(s) based on namespace/stream ID. Accordingly, the HCPU 212 may pass the workload to a dedicated embedded CPU for efficient data storage. Although a single HCPU is illustrated in FIG. 2, embodiments are not limited thereto, and the SSD 210 may include multiple HCPUs that receive the workloads and pass the workloads to embedded CPUs.

Workloads having a first ID (ID-0) are from the email server 204 and may be provided to a first embedded CPU-0 214. The first ID may be a namespace ID of nvme0$n$1. The first embedded CPU-0 214 may be configured or optimized for random R/W to boost email server performance. The first embedded CPU-0 214 loads firmware configured or optimized for 4K random R/W with a least recently used (LRU) cache. The operating system may recognize the CPU-0-related data path as a drive, nvme0$n$1.

Workloads having a second ID (ID-1) are from the KV database 206 and may be provided to a second embedded CPU-1 216. The second ID may be a namespace ID of nvme1$n$1. The second embedded CPU-1 216 is configured or optimized for small random read workloads and large sequential R/W workloads. The second embedded CPU-1 216 may load firmware supporting a zoned namespace. The operating system may recognize the CPU-1-related data path as a drive, nvme1$n$1.

Workloads having a third ID (ID-2) may be provided to a third embedded CPU-2 218.

Workloads having a fourth ID (ID-3) are from the relational database management system 208 and may be provided to a fourth embedded CPU-3 220. The fourth ID may be a namespace ID of a KV interface. The fourth embedded CPU-3 220 may be configured or optimized such that it caches data of hot database (DB) transactions, and groups write requests that belong to the same transactions. The fourth embedded CPU-3 220 may support a KV application programming interface (API). Accordingly, the respective firmware of the embedded CPUs is configured or optimized to best fit related workloads. Specifically, each embedded CPU of an SSD loads a different type of firmware.

The workloads may be distributed from the embedded CPUs (214, 216, 218, 220) to their respective channels (e.g., flash chips of the SSD) for storage and retrieval purposes. For example, the first embedded CPU-0 214 may provide workloads to CH-0 222, CH-1 224, CH-2 226, and CH-3 228, and the fourth embedded CPU-3 220 may provide workloads to CH-12 230, CH-13 232, CH-14 234, and CH-15 236. Similarly, the second embedded CPU-1 216 and the third embedded CPU-2 218 may provide workloads to corresponding channels.

Figure 3:
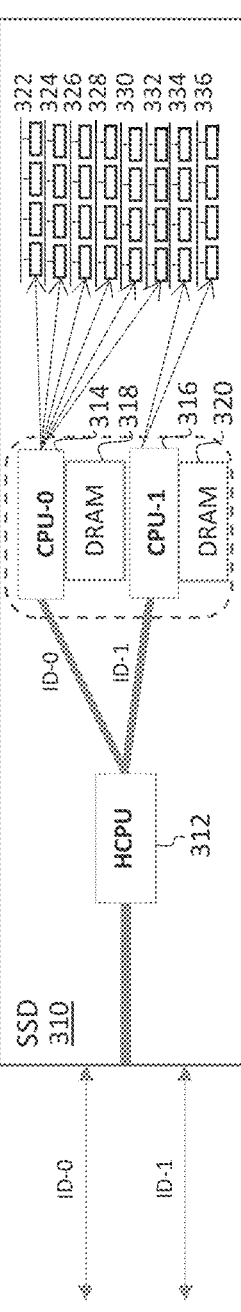
FIG. 3 is a diagram illustrating an SSD with embedded CPUs having different memory sizes, according to an embodiment.

FIG. 3 is a diagram illustrating an SSD with embedded CPUs having different memory sizes, according to an embodiment. An SSD 310 receives workloads (e.g., data blocks or commands) with a first ID (ID-0) and workloads with a second ID (ID-1) at an HCPU 312. Workloads with different identifiers are from different host applications. Workloads with the first ID (ID-0) are passed from the HCPU 312 to a first embedded CPU-0 314, and workloads with the second ID (ID-1) are passed from the HCPU 312 to a second embedded CPU-1 316. Although a single HCPU is illustrated in FIG. 3, embodiments are not limited thereto, and the SSD 310 may include multiple HCPUs that receive the workloads and pass the workloads to embedded CPUs.

The first embedded CPU-0 314 has a first dynamic random access memory (DRAM) 318 of a first size, and the second embedded CPU-1 316 has a second DRAM 320 of a second size. The size of the first DRAM 318 is larger than that of the second DRAM 320. The sizes of the DRAMs may be configured based on the firmware of the corresponding CPU, which is based on the application workloads that are to be provided to the CPU.

The first embedded CPU-0 314 and the second embedded CPU-1 316 provide workloads to different numbers of channels (e.g., flash chips). For example, the first embedded CPU-0 314 provides workloads to six channels (i.e., CH-0 322, CH-1 324, CH-2 326, CH-3 328, CH-4 330, and CH-5 332), and the second embedded CPU-1 316 provides workloads to two channels (i.e., CH-6 334 and CH-7 336). The number of channels may be configured based on the sizes of the corresponding DRAMs, or may be configured based on the firmware of the corresponding CPU, which is based on the application workloads that are to be provided to the CPU.

Figure 4:
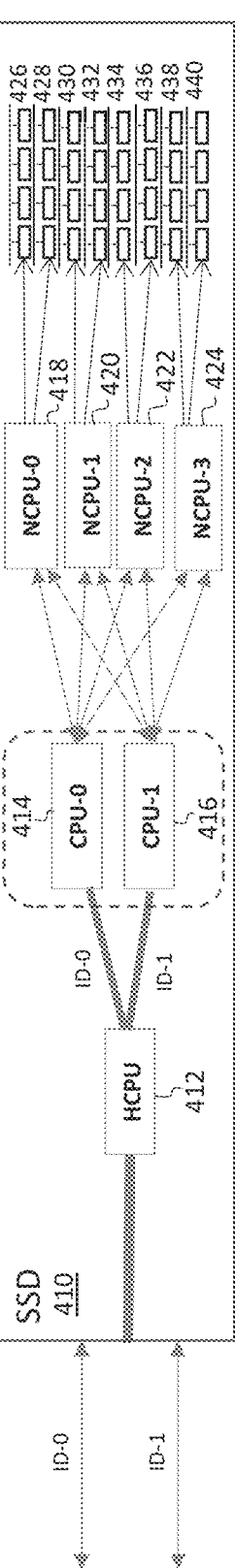
FIG. 4 is a diagram illustrating an SSD with embedded CPUs having adaptable channel paths, according to an embodiment.

FIG. 4 is a diagram illustrating an SSD with CPUs having adaptable channel paths, according to an embodiment. An SSD 410 receives workloads with a first ID (ID-0) and workloads with a second ID (ID-1) at an HCPU 412. Workloads with different identifiers are from different host applications. Workloads with a first ID (ID-0) may be passed from the HCPU 412 to a first embedded CPU-0 414, and workloads with a second ID (ID-1) may be passed from the HCPU 412 to a second embedded CPU-1 416. Although a single HCPU is illustrated in FIG. 4, embodiments are not limited thereto, and the SSD 410 may include multiple HCPUs that receive the workloads and pass the workloads to dedicated embedded CPUs.

Each of the first embedded CPU-0 414 and the second embedded CPU-1 416 accesses channels through NAND CPUs (NCPUs). Specifically, the first embedded CPU-0 414 and the second embedded CPU-1 416 may access one or more of a first NCPU-0 418, a second NCPU-1 420, a third NCPU-2 422, and a fourth NCPU-3 424. Each NCPU is configured to access two channels (e.g., flash chips). Specifically, the first CPU-0 414 may access a first channel CH-0 426 and a second channel CH-1 428. The second CPU-1 416 may access a third channel CH-2 430 and a fourth channel CH-3 432. The third CPU-2 418 may access a fifth channel CH-4 434 and a sixth channel CH-5 436. The fourth CHU-420 may access a seventh channel CH-6 438 and an eighth channel CH-7 440. The specific NCPUs accessed by the CPUs is dependent upon the number of channels required for the workloads received at the CPUs.

Embodiments are not limited to a multi-interface device, but are also applicable to a conventional device that supports only a single interface. In addition, embodiments are also applicable to heterogeneous embedded CPUs that have different capabilities, as well as different underlying hardware layouts. For example, each embedded CPU may control a different number of channels, each embedded CPU may have a different over provision space, each embedded CPU may control a NAND of a different R/W speed, and each embedded CPU may control a different NAND type.

Each embedded CPU may support more than one mapping algorithm. For example, a first embedded CPU-0 may support hash map, page level mapping, and demand-based flash translation layer (DFTL), a second embedded CPU-1 may support hash map and page level mapping, and a third embedded CPU-2 may support DFTL and B+ tree. Host interface logic (HIL) maintains the mapping information per embedded CPU. On a write request, based on the application tag, HIL may determine which embedded CPU to assign the blocks. A single request may be divided and distributed to multiple embedded CPUs that support the tagged mapping algorithms.

Figure 5:
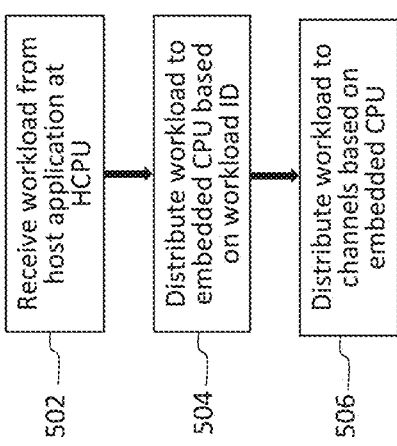
FIG. 5 is a flowchart illustrating a method of operating a memory device, according to an embodiment.

FIG. 5 is a flow chart illustrating a method of a memory device. At 502, one or more HCPUs of the memory device (e.g., SSD) may receive a workload (e.g., data block or command) from a host application. The workload includes an ID, and a type of the ID is based on the host application (e.g., namespace ID, stream ID, port). A data transfer command of the workload may be decoded at the HCPU.

At 504, the workload may be distributed to an embedded CPU of the memory device based on the ID. The embedded CPU may be one of a plurality of embedded CPUs, each configured or optimized for a different host application. Each CPU may have a different sized memory. Each CPU may correspond to the same number or a different number of channels (e.g., flash chips).

At 506, the workload may be distributed to channels of the memory device based on the embedded CPU. The workload may be distributed from the embedded CPU to one or more NAND CPUs based on the workload, and then distributed from the one or more NAND CPUs to channels corresponding to the one or more NAND CPUs. The number of the one or more NAND CPUs may be based on the workload, and each of the one or more NAND CPUs may corresponds to a set number of channels.

Figure 6:
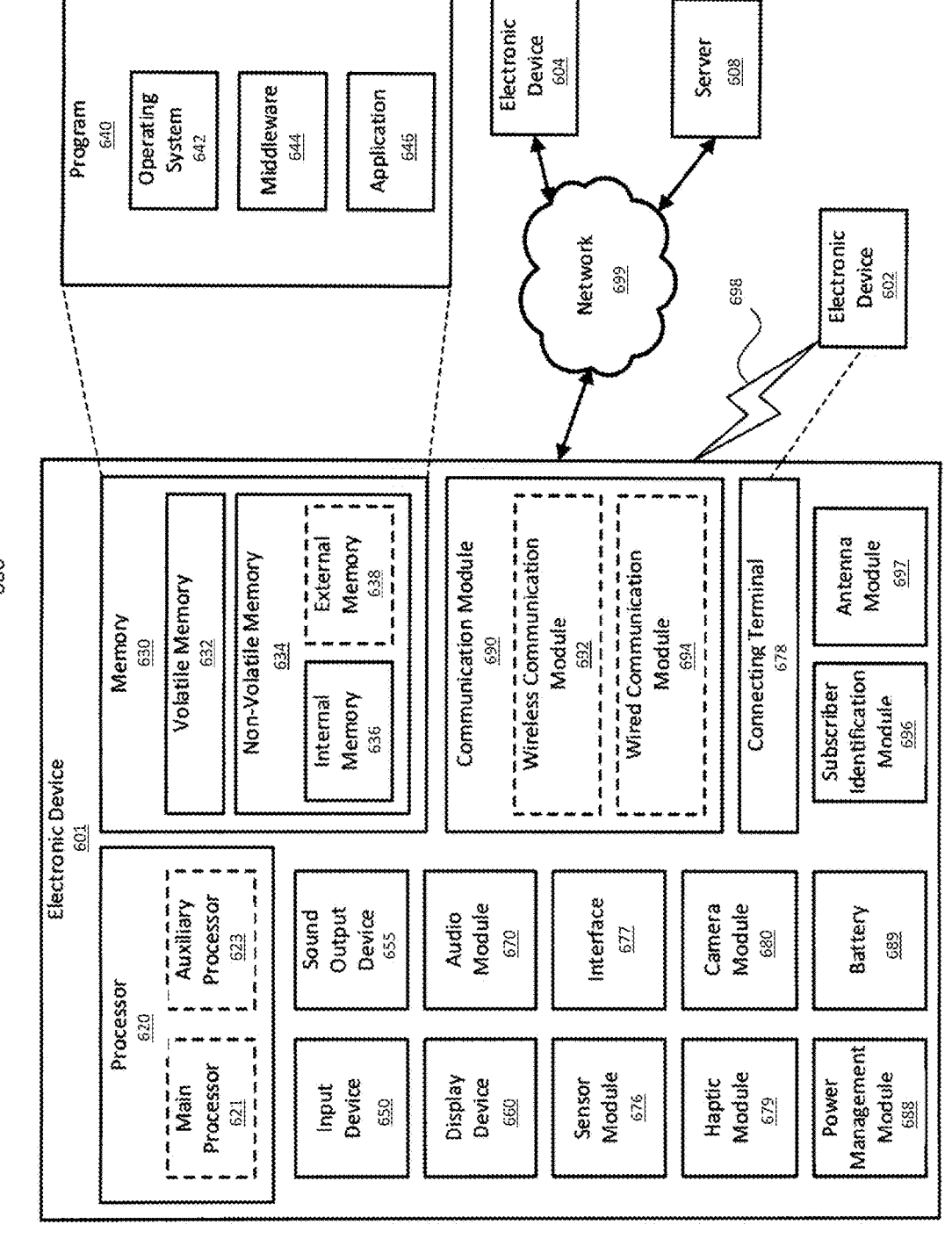
FIG. 6 illustrates a block diagram of an electronic device in a network environment, according to an embodiment.

FIG. 6 illustrates a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module

690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. The processor may correspond to the HCPU, or a combination of the HCPU, embedded CPUs, and or NAND CPUs of the SSD. As at least part of the data processing or computations, the processor 620 may load a command or data received from a host or another component (e.g., the sensor module 676 or the communication module 690) in volatile memory 632, process the command or the data stored in the volatile memory 632, and store resulting data in non-volatile memory 634. The processor 620 may include a main processor 621 (e.g., a CPU or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server comput- ing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code execut- able by an interpreter. A machine-readable storage medium may be provided in the form of a non-transitory storage medium. The term "non-transitory" indicates that the stor- age medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine- readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corre- sponding one of the plurality of components before the integration. Operations performed by the module, the pro- gram, or another component may be carried out sequentially, in parallel, repeatedly, or heuristically, or one or more of the operations may be executed in a different order or omitted, or one or more other operations may be added.

Figure 7:
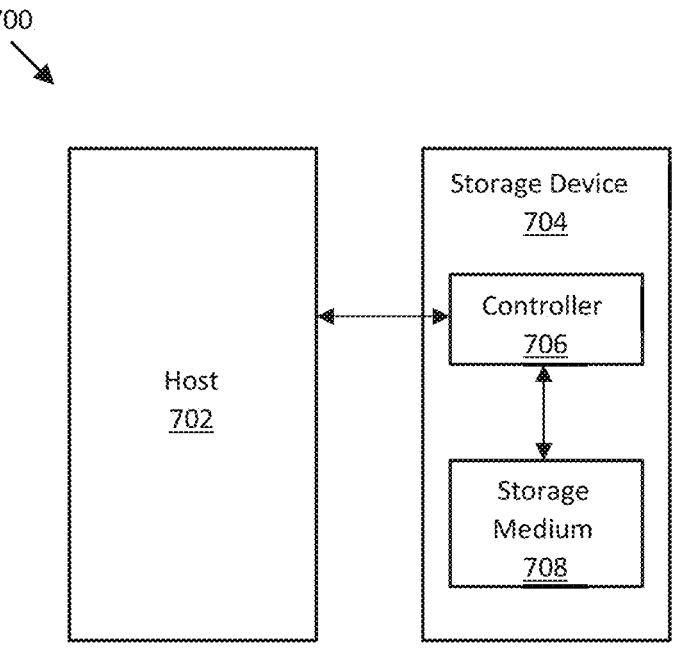
FIG. 7 illustrates a diagram of a storage system, according to an embodiment.

FIG. 7 illustrates a diagram of a storage system 700, according to an embodiment. The storage system 700 includes a host 702 and a storage device 704. Although one host and one storage device is depicted, the storage system 700 may include multiple hosts and/or multiple storage devices. The storage device 704 may be an SSD, a universal flash storage (UFS), etc. The storage device 704 includes a controller 706 and a storage medium 708 connected to the controller 706. The controller 706 may be an SSD controller, a UFS controller, etc. The storage medium 708 may include a volatile memory, a non-volatile memory, or both, and may include one or more flash memory chips (or other storage media). The controller 706 may include one or more pro- cessors, one or more error correction circuits, one or more field programmable gate arrays (FPGAs), one or more host interfaces, one or more flash bus interfaces, etc., or a combination thereof. The controller 706 may be configured to facilitate transfer of data/commands between the host 702 and the storage medium 708. The host 702 sends data/ commands to the storage device 704 to be received by the controller 706 and processed in conjunction with the storage medium 708. As described herein, the methods, processes and algorithms may be implemented on a storage device controller, such as controller 706. The arbiters, command fetchers, and command processors may be implemented in the controller 706 of the storage device 704, and the pro- cessors and buffers may be implemented in the host 702.

Although certain embodiments of the present disclosure have been described in the detailed description of the present disclosure, the present disclosure may be modified in vari- ous forms without departing from the scope of the present disclosure. Thus, the scope of the present disclosure shall not be determined merely based on the described embodiments, but rather determined based on the accompanying claims and equivalents thereto.

What is claimed is:

1. A method of a memory device, comprising:
 receiving a workload from a host application at one or more host central processing units (HCPUs) of the memory device, wherein the workload comprises an identifier (ID);
 distributing the workload to one of first and second central processing units (CPUs) of the memory device based on the ID, wherein the first and second CPUs comprise respective hardware processing units and are config- ured to load firmware corresponding to the host appli- cation based on the ID in the workload; and
 distributing the workload to channels of the memory device based on the CPU that received the workload.

2. The method of claim 1, wherein a type of the identifier is based on the host application, and comprises a namespace ID, a stream ID, or a port ID.

3. The method of claim 1, further comprising decoding a data transfer command of the workload at the one or more HCPUs.

4. The method of claim 1, wherein the first and second CPUs are configured for different host applications.

5. The method of claim 4, wherein the first and second CPUs have memories of different sizes.

6. The method of claim 4, wherein the first and second CPUs correspond to different numbers of channels.

7. The method of claim 1, wherein distributing the work- load to channels comprises:
 distributing the workload from the CPU that received the workload to one or more secondary CPUs based on the workload; and
 distributing the workload from the one or more secondary CPUs to the channels corresponding to the one or more secondary CPUs.

8. The method of claim 7, wherein a number of the one or more secondary CPUs is based on the workload.

9. The method of claim 7, wherein each of the one or more secondary CPUs corresponds to a predetermined number of channels of the memory device.

10. A memory device, comprising:

one or more host central processing units (HCPUs) configured to receive a workload from a host application, wherein the workload comprises an identifier (ID), and to distribute the workload to one of first and second central processing units (CPUs) of the memory device based on the ID, wherein the first and second CPUs comprise respective hardware processing units and are configured to load firmware corresponding to the host application based on the ID in the workload; and the CPU that received the workload configured to distribute the workload to channels of the memory device based on the CPU.

11. The memory device of claim 10, wherein a type of the identifier is based on the host application, and comprises a namespace ID, a stream ID, or a port ID.

12. The memory device of claim 10, wherein the one or more HCPUs is further configured to decode a data transfer command of the workload.

13. The memory device of claim 10, wherein the first and second CPUs are configured for different host applications.

14. The memory device of claim 13, wherein the first and second CPUs have memories of different sizes.

15. The memory device of claim 13, wherein the first and second CPUs correspond to different numbers of channels of the memory device.

16. The memory device of claim 10, further comprising one or more secondary CPUs, wherein:

the CPU that received the workload is further configured to distribute the workload to one or more secondary CPUs based on the workload; and the one or more secondary CPUs are configured to distribute the workload to the channels corresponding to the one or more secondary CPUs.

17. The memory device of claim 16, wherein:

a number of the one or more secondary CPUs is based on the workload; and each of the one or more secondary CPUs corresponds to a preconfigured number of channels of the memory device.

18. A memory device, comprising:

one or more host central processing units (HCPUs) configured to receive workloads from host applications, wherein the workloads comprise respective identifiers (IDs), and to distribute the workloads to first and second central processing units (CPUs) of the memory device based on the respective IDs, and wherein the first and second CPUs comprise respective hardware processing units and are configured to load firmware corresponding to the host application based on the ID in the workload;

the CPUs configured to distribute the workloads to respective channels of the memory device based on the CPUs; and channels configured to receive the workloads from the CPUs for data storage and retrieval.

* * * * *